(12) United States Patent
Jeon et al.

(10) Patent No.: US 10,919,772 B2
(45) Date of Patent: *Feb. 16, 2021

(54) METHOD FOR PREPARING HYDROPHOBIC METAL OXIDE-SILICA COMPOSITE AEROGEL, AND HYDROPHOBIC METAL OXIDE-SILICA COMPOSITE AEROGEL PREPARED THEREBY

(71) Applicant: LG CHEM, LTD., Seoul (KR)

(72) Inventors: Hyun Woo Jeon, Daejeon (KR); Jong Hun Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 179 days.

This patent is subject to a terminal disclaimer.

(21) Appl. No.: 15/526,221

(22) PCT Filed: Oct. 18, 2016

(86) PCT No.: PCT/KR2016/011691
§ 371 (c)(1),
(2) Date: May 11, 2017

(87) PCT Pub. No.: WO2017/078293
PCT Pub. Date: May 11, 2017

(65) Prior Publication Data
US 2017/0305749 A1    Oct. 26, 2017

(30) Foreign Application Priority Data

Nov. 3, 2015  (KR) .................. 10-2015-0153870

(51) Int. Cl.
*C01B 33/14*    (2006.01)
*C01B 33/158*    (2006.01)
*B01J 13/00*    (2006.01)

(52) U.S. Cl.
CPC ....... *C01B 33/1585* (2013.01); *B01J 13/0091* (2013.01); *C01B 33/158* (2013.01); *C01P 2006/10* (2013.01); *C01P 2006/12* (2013.01)

(58) Field of Classification Search
CPC ............... B01J 13/0091; C01B 33/158; C01B 33/1585; C01P 2006/10; C01P 2006/12
See application file for complete search history.

(56) References Cited

U.S. PATENT DOCUMENTS 3,131,072 A    4/1964  Taulli
3,895,087 A    7/1975  Ottinger et al.
(Continued)

FOREIGN PATENT DOCUMENTS

CN    1164222    11/1997
CN    1241952    1/2000
(Continued)

OTHER PUBLICATIONS

Schwertfeger, F. et al., "Hydrophobic waterglass based aerogels without solvent exchange or supercritical drying," Journal of Non-Crystalling Solids 225; 24-29 (1998).
(Continued)

*Primary Examiner* — Michael A Salvitti
(74) *Attorney, Agent, or Firm* — Dentons US LLP

(57) ABSTRACT

The present invention relates to a method of preparing a hydrophobic metal oxide-silica composite aerogel, in which a degree of hydrophobicity may be controlled while having a high specific surface area and a low tap density, and a hydrophobic metal oxide-silica composite aerogel prepared thereby. The preparation method according to the present invention may not only have excellent productivity and economic efficiency due to a relatively simpler preparation process and shorter preparation time than the related art, but may also perform an effective surface modification reaction (Continued)

by using a small amount of a surface modifier. Thus, since the surface modification reaction may be easily performed by using only a very small amount of the surface modifier, a hydrophobic metal oxide-silica composite aerogel containing about 1 wt % to 2 wt % of carbon may be prepared.

12 Claims, 3 Drawing Sheets

(56) References Cited

U.S. PATENT DOCUMENTS

| | | | |
|---|---|---|---|
| 5,705,535 | A | 1/1998 | Jansen et al. |
| 5,789,075 | A | 8/1998 | Frank et al. |
| 5,789,495 | A | 8/1998 | Burns et al. |
| 5,811,031 | A | 9/1998 | Jansen et al. |
| 5,955,140 | A | 9/1999 | Smith et al. |
| 5,962,539 | A | 10/1999 | Perrut et al. |
| 6,068,882 | A | 5/2000 | Ryu |
| 6,197,270 | B1 | 3/2001 | Sonoda et al. |
| 6,319,852 | B1 | 11/2001 | Smith et al. |
| 6,989,123 | B2 | 1/2006 | Lee et al. |
| 7,399,439 | B2 | 7/2008 | Lee et al. |
| 7,736,611 | B2 | 6/2010 | Norberg et al. |
| 7,780,890 | B2 | 8/2010 | Lee et al. |
| 7,897,648 | B2 | 3/2011 | Halimaton |
| 8,137,651 | B2 | 3/2012 | Yeo |
| 9,834,446 | B2 * | 12/2017 | Kim ................... B01J 13/0091 |
| 9,862,614 | B2 | 1/2018 | Oh et al. |
| 10,260,670 | B2 * | 4/2019 | Kim ...................... F16L 59/026 |
| 10,294,111 | B2 * | 5/2019 | Kim ...................... C01B 33/154 |
| 10,336,621 | B2 * | 7/2019 | Kim ...................... C01B 33/154 |
| 2001/0034375 | A1 * | 10/2001 | Schwertfeger ....... B01J 13/0091 516/98 |
| 2002/0094426 | A1 | 7/2002 | Stepanian et al. |
| 2004/0029982 | A1 | 2/2004 | Erkey et al. |
| 2004/0120876 | A1 | 6/2004 | Meyer et al. |
| 2005/0046086 | A1 | 3/2005 | Lee et al. |
| 2005/0167891 | A1 | 8/2005 | Lee et al. |
| 2005/0192366 | A1 | 9/2005 | Ou et al. |
| 2005/0192367 | A1 | 9/2005 | Ou et al. |
| 2006/0125158 | A1 | 6/2006 | Rouanet et al. |
| 2006/0199455 | A1 | 9/2006 | Stepanian et al. |
| 2006/0286813 | A1 | 12/2006 | Meredith et al. |
| 2007/0148435 | A1 | 6/2007 | Meredith et al. |
| 2007/0154379 | A1 | 7/2007 | Nakanishi et al. |
| 2008/0034968 | A1 | 2/2008 | Nordberg et al. |
| 2008/0069753 | A1 | 3/2008 | Floess et al. |
| 2008/0070146 | A1 | 3/2008 | Fomitchev et al. |
| 2008/0081014 | A1 | 4/2008 | Ahn et al. |
| 2008/0093016 | A1 | 4/2008 | Lee et al. |
| 2008/0292889 | A1 | 11/2008 | Harvey et al. |
| 2008/0311398 | A1 | 12/2008 | Bauer et al. |
| 2009/0229032 | A1 | 9/2009 | Stepanian et al. |
| 2009/0247655 | A1 | 10/2009 | Kim et al. |
| 2010/0119432 | A1 | 5/2010 | Yeo |
| 2010/0172815 | A1 | 7/2010 | Park et al. |
| 2010/0204355 | A1 | 8/2010 | Leventis et al. |
| 2010/0247897 | A1 | 9/2010 | Leventis et al. |
| 2011/0000370 | A1 * | 1/2011 | Norberg ................ B01D 53/508 95/90 |
| 2011/0223329 | A1 | 9/2011 | Meredith et al. |
| 2011/0240907 | A1 * | 10/2011 | Sharma ............... C01B 33/1585 252/62 |
| 2011/0243837 | A1 | 10/2011 | Shan et al. |
| 2012/0025127 | A1 * | 2/2012 | Yeo ...................... C01B 33/155 252/62 |
| 2012/0171488 | A1 | 7/2012 | Yeo et al. |
| 2012/0225003 | A1 | 9/2012 | Joung et al. |
| 2012/0244040 | A1 | 9/2012 | Joung et al. |
| 2013/0106008 | A1 | 5/2013 | Ahn et al. |
| 2013/0189521 | A1 | 7/2013 | Fukuju et al. |
| 2013/0296596 | A1 | 11/2013 | Suh et al. |
| 2014/0183290 | A1 | 7/2014 | Xiao |
| 2014/0273701 | A1 | 9/2014 | Samanta et al. |
| 2014/0287641 | A1 | 9/2014 | Steiner, III |
| 2014/0323589 | A1 | 10/2014 | Lazar et al. |
| 2015/0065590 | A1 | 3/2015 | Rhine et al. |
| 2015/0069156 | A1 | 3/2015 | Lee |
| 2015/0225630 | A1 | 8/2015 | Hosoi et al. |
| 2016/0115685 | A1 | 4/2016 | Bonnardel et al. |
| 2016/0199849 | A1 | 7/2016 | Wada |
| 2016/0258153 | A1 | 9/2016 | Koebel et al. |
| 2016/0264427 | A1 | 9/2016 | Oh et al. |
| 2016/0280557 | A1 * | 9/2016 | Kim ...................... B01J 13/0091 |
| 2017/0074449 | A1 | 3/2017 | Rhine et al. |
| 2017/0305749 | A1 * | 10/2017 | Jeon ...................... C01B 33/158 |
| 2018/0002181 | A1 * | 1/2018 | Kim ...................... C01B 33/154 |
| 2018/0002182 | A1 * | 1/2018 | Jeon ...................... B01J 13/0091 |
| 2018/0010726 | A1 | 1/2018 | Kim et al. |
| 2018/0127277 | A1 * | 5/2018 | Kim ...................... B01J 13/0091 |
| 2018/0127278 | A1 * | 5/2018 | Kim ...................... B01J 20/28057 |
| 2018/0127279 | A1 * | 5/2018 | Kim ........................ C01F 5/02 |
| 2018/0193825 | A1 * | 7/2018 | Kim ........................ B01J 21/02 |
| 2018/0194634 | A1 * | 7/2018 | Kang .................... C01B 33/158 |
| 2018/0208474 | A1 * | 7/2018 | Kim ...................... C01B 33/1585 |
| 2018/0305215 | A1 * | 10/2018 | Kim ...................... C01B 33/157 |
| 2018/0370809 | A1 * | 12/2018 | Lee ...................... C01B 33/1585 |
| 2019/0062169 | A1 * | 2/2019 | Kim ...................... C01B 33/157 |
| 2019/0135645 | A1 * | 5/2019 | Kim ...................... B01J 37/031 |
| 2019/0194027 | A1 * | 6/2019 | Kim ...................... C01B 33/1585 |
| 2020/0010328 | A1 * | 1/2020 | Kim ...................... B01J 13/0091 |

FOREIGN PATENT DOCUMENTS

| | | |
|---|---|---|
| CN | 1749214 | 3/2006 |
| CN | 1839024 | 9/2006 |
| CN | 1888302 | 1/2007 |
| CN | 101132856 | 2/2008 |
| CN | 101450852 | 6/2009 |
| CN | 101517012 | 8/2009 |
| CN | 101646622 | 2/2010 |
| CN | 101691227 | 4/2010 |
| CN | 101844771 | 9/2010 |
| CN | 102317209 | 1/2012 |
| CN | 102557577 | 7/2012 |
| CN | 102674374 | 9/2012 |
| CN | 102951650 | 3/2013 |
| CN | 103118979 | 5/2013 |
| CN | 103130231 | 6/2013 |
| CN | 103771428 | 5/2014 |
| CN | 103818912 | 5/2014 |
| CN | 104030301 | 9/2014 |
| CN | 104961135 | 10/2015 |
| DE | 19648798 | 6/1998 |
| EP | 2231789 B1 | 2/2012 |
| EP | 2722311 A2 | 4/2014 |
| EP | 2813338 A1 | 12/2014 |
| EP | 2927194 A1 | 10/2015 |
| EP | 2930147 A1 | 10/2015 |
| EP | 3216762 | 9/2017 |
| EP | 3257812 A1 | 12/2017 |
| JP | H10-70121 | 3/1998 |
| JP | H10-236817 | 9/1998 |
| JP | H11-28353 | 2/1999 |
| JP | 2002-256170 | 9/2002 |
| JP | 2005-305336 | 11/2005 |
| JP | 2007-519780 | 7/2007 |
| JP | 2007-524528 | 8/2007 |
| JP | 2007-524739 | 8/2007 |
| JP | 2008-195851 | 8/2008 |
| JP | 2011-190551 | 9/2011 |
| JP | 2014051643 A | 3/2014 |
| JP | 2016-017255 | 2/2016 |
| KR | 10-1999-0009158 | 2/1999 |
| KR | 10-2000-0057244 | 9/2000 |
| KR | 10-0385829 | 10/2003 |
| KR | 10-0566390 | 3/2006 |
| KR | 10-2008-0084241 A | 9/2008 |
| KR | 10-2008-0093772 | 10/2008 |
| KR | 10-0909732 | 7/2009 |
| KR | 10-2009-0115703 | 11/2009 |
| KR | 10-2010-0010350 | 2/2010 |
| KR | 10-2010-0041737 | 4/2010 |

(56) References Cited

FOREIGN PATENT DOCUMENTS

| | | |
|---|---|---|
| KR | 10-2010-0053350 | 5/2010 |
| KR | 10-2010-0090989 A | 8/2010 |
| KR | 10-2010-0133268 | 12/2010 |
| KR | 10-2011-0082379 | 7/2011 |
| KR | 10-2011-0125773 | 11/2011 |
| KR | 10-2011-0126381 | 11/2011 |
| KR | 10-1082982 | 11/2011 |
| KR | 10-1105436 | 1/2012 |
| KR | 10-2012-0012836 | 2/2012 |
| KR | 10-2012-0030791 | 3/2012 |
| KR | 10-2012-0033159 | 4/2012 |
| KR | 10-1155431 | 6/2012 |
| KR | 10-2012-0070948 | 7/2012 |
| KR | 10-2012-0126741 | 11/2012 |
| KR | 10-1199958 | 11/2012 |
| KR | 10-2013-0051304 | 5/2013 |
| KR | 10-2013-0123942 | 11/2013 |
| KR | 10-2013-0128365 | 11/2013 |
| KR | 10-2014-0005177 | 1/2014 |
| KR | 10-2014-0050867 | 4/2014 |
| KR | 10-2014-0076022 | 6/2014 |
| KR | 10-2014-0146814 A | 12/2014 |
| KR | 10-1506096 | 3/2015 |
| KR | 10-2015-0089319 | 8/2015 |
| KR | 10-2015-0090320 | 8/2015 |
| KR | 10-2015-0093062 | 8/2015 |
| KR | 10-2015-0093063 | 8/2015 |
| KR | 10-2015-0093122 A | 8/2015 |
| KR | 10-2015-0093123 A | 8/2015 |
| KR | 10-1789371 | 10/2017 |
| WO | 1996/006808 | 3/1996 |
| WO | 2005/003476 | 1/2005 |
| WO | 2005/110919 | 11/2005 |
| WO | 2008-038935 | 4/2008 |
| WO | 2008/117995 | 10/2008 |
| WO | 2008/143384 | 11/2008 |
| WO | 2009/033065 | 3/2009 |
| WO | 2010/080237 | 7/2010 |
| WO | 2010/143902 | 12/2010 |
| WO | 2012044052 | 4/2012 |
| WO | 2014-198931 | 12/2014 |
| WO | 2015014813 | 2/2015 |
| WO | 2015/119430 | 8/2015 |

OTHER PUBLICATIONS

Ayse Meric Kartal et al., "Surface modification of silica aerogels by hexamethyldisilazane-carbon dioxide mixtures and their phase behavior," Journal of Supercritical Fluids 53; 115-120 (2010).
Aravind et al, "Mesoporous silica-alumina aerogels with high thermal pore stability through hybrid sol-gel route followed by subcritical drying," Microporous and Mesoporous Materials 96: 14-20 (2006).
Aravind et al, "Nonsupercritically Dried Silica-Alumina Aerogels—Effect of Gelation pH," Journal of American Ceramic Society 91(4): 1326-1328 (2008).
Aravind et al., "Ambient pressure drying: a successful approach for the preparation of silica and silica based mixed oxide aerogels," Journal of Sol-Gel Science and Technology, 54: 105-117 (2010).
Kartal and Erkey, "Surface modification of silica aerogels by hexamethyldisilazane-carbon dioxide mixtures and their phase behavior," Journal of Supercritical Fluids 53: 115-120 (2010).
Bhagat et al, "A cost-effective and fast synthesis of nanoporous $SiO_2$ aerogel powders using water-glass via ambient pressure drying route," Solid State Sciences 9: 628-635 (2007).
Bhagat et al., "Superhydrophobic silica aerogel powders with simultaneous surface modification, solvent exchange and sodium ion removal from hydrogels," Microporous and Mesoporous Materials 112: 504-509 (2008).
Bhagat et al., "Textural properties of ambient pressure dried waterglass based silica aerogel beads: One day synthesis," Microporous and Mesoporous Materials 96: 237-244 (2006).
Cho et al, "Study on the Extraction of Monasil PCA using Liquid $CO_2$," Korean Chem. Eng. Res. 50(4): 684-689 (2012). English Language Abstract included.
Dorcheh and Abbasi, "Silica aerogel; synthesis, properties and characterization," J. Mat. Proc. Tech. 199: 10-26 (2008).
Hong et al., "Synthesis of spherical silica aerogel powder by emulsion polymerization technique," J. Ceram. Proc. Res. 13(Special 1): s145-s148 (2012).
Kwon et al., "Ambient-dried silica aerogel doped with $TiO_2$ powder for thermal insulation," Journal of Materials Science 35: 6075-6079 (2000).
Lee et al., "Synthesis of silica aerogels from waterglass via new modified ambient drying," Journal of Materials Science 37(11): 2237-2241 (2002).
Purwanto, D. and Y. Wulandari, "Effects of precursors concentration on surface area of silica aerogels synthesized via an ambient pressure drying method," The 1st International Seminar on Fundamental & Application of Chemical Engineering, pp. A017-1 to A017-4 (Nov. 3-4, 2010, Bali—Indonesia).
Yang et al., "Porous organic-inorganic hybrid aerogels based on bridging acetylacetonate," Microporous and Mesoporous Materials 187: 108-113 (2014).
Rao et al., "Effect of precursors, methylation agents and solvents on the physiochemical properties of silica aerogels prepared by atmospheric pressure drying method," Journal of Non-Crystalline Solids 296: 165-171 (2001).
Rao et al., "Effect of protic solvents on the physical properties of the ambient pressure dried hydrophobic silica aerogels using sodium solicate precursor," Journal of Porous Materials 15: 507-512 (2008).
Ren et al., "Fabrication of silica aerogel micro cylinder for ICF target," Journal of Functional Materials 37: 834-836 (2006). English Language Abstract included on last page.
Schwertfeger et al., "Hydrophobic waterglass based aerogels without solvent exchange or supercritical drying," Journal of Non-Crystalline Solids 225: 24-29 (1998).
Sinko et al., "Nanostructure of Gel-Derived Aluminosilicate Materials," Langmuir 24: 949-956 (2008).
Sinko, "Influence of Chemical Conditions on the Nanoporous Structure of Silicate Aerogels," Materials 3: 704-740 (2010).
Wei et al, "Rich photoluminescence emission of $SnO_2$—$SiO_2$ composite aerogels prepared with a co-fed precursor sol-gel process," Journal of the Chinese Institiute of Chemical Engineers 38: 477-481 (2007).
XP-002782924, Database WPI Week 200578, AN2005-762993, Thomson Scientific—Summary of Application No. JP20040126923. published as JP2005305336 (2017).
Xu et al, "Preparation and characterization of silica-titania aerogel-like balls by ambient pressure drying," Journal of Sol-Gel Science and Technology 41: 203-207 (2007).

\* cited by examiner

METHOD FOR PREPARING HYDROPHOBIC METAL OXIDE-SILICA COMPOSITE AEROGEL, AND HYDROPHOBIC METAL OXIDE-SILICA COMPOSITE AEROGEL PREPARED THEREBY

TECHNICAL FIELD

Cross-reference to Related Applications

This application is a National Stage Entry of International Application No. PCT/KR2016/011691, filed on Oct. 18, 2016, and claims the benefit of and priority to Korean Application No. 10-2015-0153870, filed on Nov. 3, 2015, all of which are hereby incorporated by reference in their entirety for all purposes as if fully set forth herein.

Technical Field

The present invention relates to a method of preparing a hydrophobic metal oxide-silica composite aerogel, in which a degree of hydrophobicity may be controlled while having a high specific surface area and a low tap density, and a hydrophobic metal oxide-silica composite aerogel prepared thereby.

Background Art

Since an aerogel, as a high specific area ($\geq 500$ m$^2$/g), ultra-porous material having a porosity of about 90% to about 99.9% and a pore diameter of about 1 nm to about 100 nm, has excellent characteristics such as ultra lightweightness, ultra insulation, and ultra-low dielectric constant, research into the applications of the aerogel as a transparent insulator and an environmentally-friendly high-temperature insulator, an ultra-low dielectric thin film for a highly integrated device, a catalyst and a catalyst support, an electrode for a supercapacitor, and an electrode material for desalination as well as the development of an aerogel material has been actively conducted.

The biggest advantage of the aerogel is super-insulation having a thermal conductivity of 0.300 W/m·K or less which is lower than that of an organic insulation material such as a typical Styrofoam. Also, the aerogel may address fire vulnerability and generation of toxic gas in case of fire, i.e., fatal weaknesses of a typical organic insulation material.

In general, a wet gel is prepared from a silica precursor such as water glass or tetraethoxysilane (TEOS), and an aerogel is then prepared by removing a liquid component in the wet gel without destroying its microstructure. A silica aerogel may be categorized into three typical forms, powder, granules, and monolith, and the silica aerogel is generally prepared in the form of powder.

The silica aerogel powder may be commercialized in a form, such as an aerogel blanket or aerogel sheet, by compositing with fibers, and, since the blanket or sheet has flexibility, it may be bent, folded, or cut to a predetermined size or shape. Thus, the silica aerogel may be used in household goods, such as jackets or shoes, as well as industrial applications such as an insulation panel of a liquefied natural gas (LNG) carrier, an industrial insulation material and a space suit, transportation and vehicles, and an insulation material for power generation. Furthermore, in a case where a silica aerogel is used in a fire door as well as a roof or floor in a home such as an apartment, it has a significant effect in preventing fire.

However, since the silica aerogel powder may be scattered due to high porosity, very low tap density, and small particle size, handling may be difficult and fill may not be easy.

Also, although the silica aerogel monolith has high transparency in visible light region, the silica aerogel monolith may have a size limitation, may be difficult to be molded in various shapes, and may be easily broken.

In order to address the above-described limitations of the silica aerogel powder and monolith, attempts have been made to increase ease of handling and shape-responsiveness by preparing silica aerogel granules having a diameter of 0.5 mm or more. For example, there are methods such as the method in which a reaction solution obtained by hydrolyzing alkoxysilane is prepared as a filler, gelation is performed by polycondensation of the filler with a catalyst, a hydrophobic treatment is performed by reacting with a hydrophobic agent, and supercritical drying is then performed to obtain hydrophobic silica aerogel granules; and the method in which aerogel particles including additives and binder are supplied to a molding machine and compressed to prepare silica aerogel granules.

However, since the above-described methods use an ancillary granulating device and an additive such as a binder, technically complex process and long process time may not only be required, but complex processing procedures and high investment costs may also be required when a silica aerogel is mass-produced by the above-described methods. As a result, a lot of time and expensive chemicals are required, and accordingly, production costs may not only be increased, but also a particle size of the finally obtainable silica aerogel may not be uniform or may be excessively large.

Furthermore, since gel structure characteristics and physical properties are reduced when the silica aerogel absorbs moisture, there is a need to develop a method, which may permanently prevent the absorption of moisture in the air, for ease of use in industry. Thus, methods of preparing a silica aerogel having permanent hydrophobicity by performing a hydrophobic treatment on a surface of the silica aerogel have been proposed, and, recently, a hydrophobic metal oxide-silica composite aerogel is being prepared based on the methods of preparing a silica aerogel having hydrophobicity. A specific example is as follows.

In general, a method of preparing a hydrophobic metal oxide-silica composite aerogel is performed by the steps of: preparing a silica sol by hydrolysis of tetra ethyl ortho silicate (TEOS) or water glass using an acid catalyst, adding a basic catalyst thereto, and performing a condensation reaction to prepare a hydrophilic wet gel (first step); aging the wet gel (second step); performing solvent substitution in which the aged wet gel is put in an organic solvent to substitute water present in the wet gel with the organic solvent (third step); preparing a hydrophobic wet gel by adding a surface modifier to the solvent-substituted wet gel and performing a modification reaction for a long period of time (fourth step); adding an organic solvent to the hydrophobic wet gel to perform additional solvent substitution (fifth step); and preparing a hydrophobic metal oxide-silica composite aerogel by washing and drying the hydrophobic wet gel (sixth step) (see FIG. 1).

However, in a case in which a hydrophobic metal oxide-silica composite aerogel is prepared by using the above method, manufacturing costs may be high and productivity and process continuity may be poor, for example, large amounts of the organic solvent and the surface modifier are required and a lot of time is consumed in the surface modification reaction. In particular, there are difficulties in preparing a hydrophobic metal oxide-silica composite aerogel having a controlled degree of hydrophobicity and a low carbon content by performing a hydrophobic reaction only on the surface of the metal oxide-silica composite aerogel using the above method. Thus, there are many difficulties in commercialization.

Therefore, there is a need to develop a method which may prepare a hydrophobic metal oxide-silica composite aerogel having excellent properties, such as tap density, and a controlled degree of hydrophobicity while having low manufacturing costs as well as excellent productivity and process continuity.

DISCLOSURE OF THE INVENTION

Technical Problem

An aspect of the present invention provides a method of preparing a hydrophobic metal oxide-silica composite aerogel which may prepare a hydrophobic metal oxide-silica composite aerogel having a high specific surface area and a low tap density as well as excellent economic efficiency and productivity due to a relatively simpler preparation process, shorter preparation time, and lower preparation cost than the related art.

Another aspect of the present invention provides a hydrophobic metal oxide-silica composite aerogel prepared by the above preparation method.

Technical Solution

According to an aspect of the present invention, there is provided a method of preparing a hydrophobic metal oxide-silica composite aerogel including the steps of: adding a metal ion solution to a water glass solution and mixing together to prepare a metal oxide-silica composite gel agglomerate (step 1); primarily drying the agglomerate to prepare a powdery metal oxide-silica composite gel (step 2); surface-modifying the metal oxide-silica composite gel to prepare a hydrophobic metal oxide-silica composite wet gel (step 3), and secondarily drying the hydrophobic metal oxide-silica composite wet gel (step 4).

According to another aspect of the present invention, there is provided a hydrophobic metal oxide-silica composite aerogel prepared by the above method.

Advantageous Effects

A method of preparing a hydrophobic metal oxide-silica composite aerogel according to the present invention may not only have excellent productivity and economic efficiency due to a relatively simpler preparation process and shorter preparation time than the related art, but may also perform an effective surface modification reaction by using a small amount of a surface modifier. Accordingly, the method may prepare a hydrophobic metal oxide-silica composite aerogel having a low degree of hydrophobicity and containing a small amount of carbon as well as a hydrophobic metal oxide-silica composite aerogel having a high degree of hydrophobicity and containing a larger amount of carbon by adjusting the amount of the surface modifier used, if necessary. In particular, since the surface modification reaction may be easily performed by using only a very small amount of the surface modifier, a hydrophobic metal oxide-silica composite aerogel containing about 1 wt % to 2 wt % of carbon may be prepared.

Furthermore, a hydrophobic metal oxide-silica composite aerogel prepared by the method according to the present invention may have characteristics of a high degree of hydrophobicity while having a high specific surface area and a low tap density, or may have characteristics of a low degree of hydrophobicity in which about 1 wt % to 2 wt % of carbon is contained.

Thus, the method of preparing a hydrophobic metal oxide-silica composite aerogel according to the present invention and the hydrophobic metal oxide-silica composite aerogel prepared by the method are suitable for industries that need the method and the hydrophobic metal oxide-silica composite aerogel, particularly, industries that need a metal oxide-silica composite aerogel having various degrees of hydrophobicity as needed.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a low-cost, high-efficiency method of preparing a hydrophobic metal oxide-silica composite aerogel in comparison to a conventional preparation method.

Figure 1:
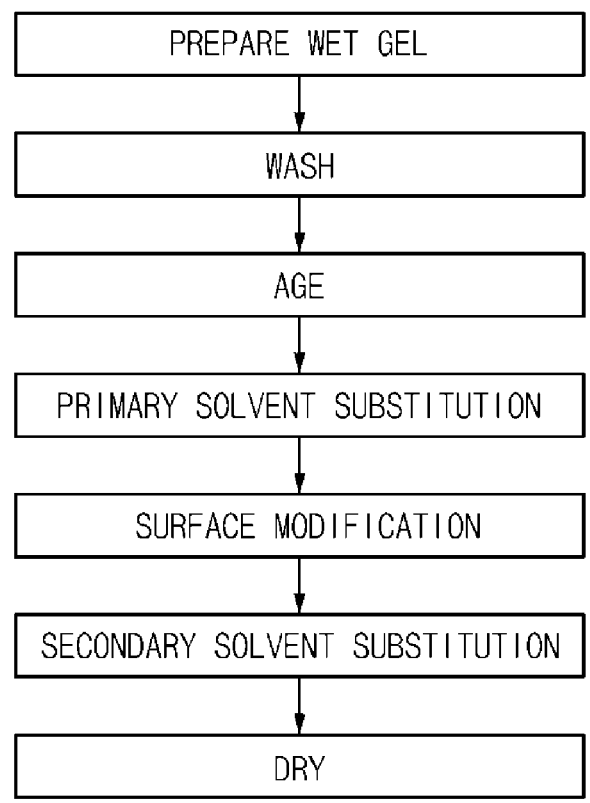
FIG. 1 schematically illustrates a flowchart of a conventional general method of preparing a hydrophobic metal oxide-silica composite aerogel.

In general, a hydrophobic metal oxide-silica composite aerogel is prepared by a method including the steps of: preparing a hydrophilic metal oxide-silica composite wet gel (first step); aging the wet gel (second step, may be skipped); performing primary solvent substitution (third step); performing surface modification (fourth step); performing secondary solvent substitution (fifth step); and washing and drying (sixth step) (see FIG. 1). With respect to the conventional and general preparation method as described above, since multiple process steps may be undertaken and long reaction time and a large amount of a surface modifier are required for effective surface modification, manufacturing costs are high, and thus, productivity and economic efficiency may be poor. Also, with respect to the conventional preparation method, since it is essential to use the large amount of the surface modifier for easy surface modification, there is a limitation in preparing a metal oxide-silica composite aerogel having a low degree of hydrophobicity and containing a small amount of carbon. Thus, there are difficulties in applying the conventional preparation method to real industry.

Figure 2:
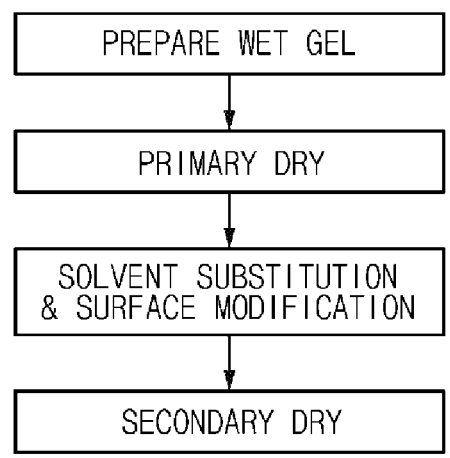
FIG. 2 schematically illustrates a flowchart of a method of preparing a hydrophobic metal oxide-silica composite aerogel according to an embodiment of the present invention.

Therefore, the present invention provides a preparation method, which may prepare a hydrophobic metal oxide-silica composite aerogel having a low degree of hydrophobicity and containing a small amount of carbon as well as a hydrophobic metal oxide-silica composite aerogel having a high degree of hydrophobicity and containing a large amount of carbon by adjusting an amount of a surface modifier used, because the method may perform an effective surface modification reaction using a small amount of the surface modifier, and which has excellent productivity and economic efficiency due to a relatively simple preparation process and short preparation time, Hereinafter, a method of preparing a hydrophobic metal oxide-silica composite aerogel according to an embodiment of the present invention will be described in detail with reference to FIG. 2.

FIG. 2 schematically illustrates a flowchart of the method of preparing a hydrophobic metal oxide-silica composite aerogel according to the embodiment of the present invention.

The preparation method according to the embodiment of the present invention includes the steps of: adding a metal ion solution to a water glass solution and mixing together to prepare a metal oxide-silica composite gel agglomerate (step 1); primarily drying the agglomerate to prepare a powdery metal oxide-silica composite gel (step 2); surface-modifying the metal oxide-silica composite gel to prepare a hydrophobic metal oxide-silica composite wet gel (step 3), and secondarily drying the hydrophobic metal oxide-silica composite wet gel (step 4).

Also, the preparation method according to the embodiment of the present invention further includes a step of washing the metal oxide-silica composite gel agglomerate before the drying of step 2.

Step 1 is a step for preparing a metal oxide-silica composite gel by reacting a water glass solution with a metal ion solution, and may be performed by adding the metal ion solution to the water glass solution and mixing together.

Furthermore, in step 1, an acid catalyst may be further added and mixed together, and, in this case, the acid catalyst may be simultaneously added with the metal ion solution, or, after the metal ion solution is added to the water glass solution and mixed together, the acid catalyst may be sequentially added and mixed therewith.

The mixing is not particularly limited, but, for example, may be performed by stirring, and the stirring may be performed using a magnetic bar at 300 rpm to 500 rpm for 1 hour to 3 hours.

The water glass solution may be a dilute solution in which distilled water is added to water glass and mixed, and the water glass may be sodium silicate ($Na_2SiO_3$) as an alkali silicate salt obtained by melting silicon dioxide ($SiO_2$) and alkali. In this case, the sodium silicate may contain 28 wt % to 30 wt % of silicon dioxide ($SiO_2$). A concentration of water glass in the water glass solution may be in a range of 0.1 M to 2.0 M. That is, the water glass solution may contain the water glass in an amount of 0.1 M to 2.0 M. In a case in which the water glass concentration is less than 0.1 M, a structure of aerogel may not be properly formed, and since the structure may collapse without withstanding a shrinkage phenomenon occurred during drying even if the aerogel is formed, physical properties may be significantly deteriorated. Also, in a case in which the water glass concentration is greater than 2.0 M, since density of the aerogel structure is high, the structure may withstand the shrinkage phenomenon occurred during drying, and thus, the collapse of the structure may be alleviated, but specific surface area characteristics may be reduced.

The metal ion solution may be prepared by dissolving a metal compound in a solvent, and a concentration of metal ions in the metal ion solution may be in a range of 0.05 M to 2.0 M. Specifically, the metal ion solution may be a binary metal ion solution including calcium ions ($Ca^{2+}$) and magnesium ions ($Mg^{2+}$), and, in this case, a molar ratio of the calcium ion ($Ca^{2+}$) to the magnesium ion ($Mg^{2+}$) may be in a range of 1:0.3 to 1:3. That is, the metal ion solution may be one which is prepared by dissolving a calcium compound and a magnesium compound in the solvent, and the calcium compound and the magnesium compound may be a hydrate of calcium chloride and a hydrate of magnesium chloride, respectively. Specifically, the calcium compound may be calcium chloride dihydrate ($CaCl_2.2H_2O$), and the magnesium compound may be magnesium chloride hexahydrate ($MgCl_2.6H_2O$). Also, the solvent is not particularly limited as long as it may sufficiently dissolve the calcium compound and the magnesium compound, but, for example, may be distilled water.

Furthermore, the metal ion solution may be added in an amount such that the metal ions in the solution and the water glass in the water glass solution are easily reacted with each other, and, specifically, the metal ion solution may be added in an amount such that a molar ratio of the metal ions to the water glass contained in the water glass solution is in a range of 0.1 to 1.

The acid catalyst may promote gelation of a metal oxide-silica composite sol, which is formed by the reaction of the water glass in the water glass solution and the metal ions in the metal ion solution, so that the metal oxide-silica composite gel agglomerate may be easily formed. Specifically, step 1 may be performed at a pH of 7 to 8 so as to facilitate the gelation, and the pH may be adjusted by the acid catalyst. An amount of the acid catalyst used is not particularly limited, but the acid catalyst may be added in an amount by which the pH may be adjusted within the above range.

The acid catalyst is not particularly limited, but may, for example, be at least one selected from the group consisting of hydrochloric acid, nitric acid, acetic acid, sulfuric acid, and hydrofluoric acid.

Step 2 is a step of drying the metal oxide-silica composite gel agglomerate to prepare a powdery metal oxide-silica composite gel, in order to increase reactivity in the surface modification reaction to be described later.

The drying is not particularly limited, but may be performed under conditions in which moisture in the agglomerate is completely removed to form powder, and, specifically, the drying may be performed by atmospheric pressure drying at a temperature of 100° C. to 150° C. for 1 hour to 2 hours.

In the preparation method according to the embodiment of the present invention, since the metal oxide-silica composite gel agglomerate is dried before the surface modification to prepare the powdery metal oxide-silica composite gel and the surface modification reaction to be described later is performed, the preparation method may increase reactivity for surface modification of the metal oxide-silica composite gel, and accordingly, the surface modification may be effectively performed by using only a small amount of the surface modifier.

The preparation method according to the embodiment of the present invention may further include a step of washing the metal oxide-silica composite gel agglomerate before the drying of step 2.

The washing is to remove impurities and sodium ions ($Na^+$) in the agglomerate and is not particularly limited, but, specifically, the washing may be performed using distilled water, alcohol, or a mixture thereof. The alcohol is not particularly limited, but may, for example, be ethanol and anhydrous or water-containing ethanol.

Herein, the sodium ions ($Na^+$) are from the water glass, wherein the sodium ions ($Na^+$) may be generated by the reaction of the water glass with the metal ions to cause a substitution reaction between the sodium ions ($Na^+$) in the water glass and the metal ions.

Step 3 is a step of surface-modifying the metal oxide-silica composite gel to prepare a hydrophobic metal oxide-silica composite wet gel, and may be performed by adding and dispersing the metal oxide-silica composite gel to a non-polar organic solvent, adding a surface modifier, and performing a reaction.

The surface modification is not particularly limited, but may be performed by performing a surface modification reaction at a temperature of 55° C. to 65° C., and, in this case, reaction time may be within 1 hour. Also, the reaction may be performed while stirring, and, in this case, the stirring may be performed by rotating at 100 rpm to 200 rpm using a magnetic bar.

The non-polar organic solvent may play a role in preventing shrinkage and cracking of pores, which may occur while water present in the pores of the hydrophobic metal oxide-silica composite wet gel is vaporized into a vapor phase during drying of step 4 to be described later, by substituting the water present in the pores of the prepared hydrophobic metal oxide-silica composite wet gel. Accordingly, a decrease in surface area and a change in pore structure, which occur during the drying of the hydrophobic metal oxide-silica composite wet gel to be described later, may be prevented. The non-polar organic solvent is not particularly limited, but, specifically, may be at least one selected from the group consisting of hexane, heptane, toluene, and xylene.

The surface modifier may play a role in hydrophobically surface-modifying the metal oxide-silica composite gel by reacting with a hydrophilic group (—OH) of the metal oxide-silica composite gel. In this case, the surface modifier may be added in a molar ratio of 0.01 to 0.5 with respect to the water glass in the water glass solution initially used. Also, the surface modifier may be at least one selected from the group consisting of trimethylchlorosilane (TMCS), hexamethyldisilazane (HMDS), methyltrimethoxysilane, and trimethylethoxysilane.

In the preparation method according to the embodiment of the present invention, since the solvent substitution and surface modification may be simultaneously performed in a single step as described above, process steps and process time may be reduced to improve productivity and economic efficiency. In addition, since the surface modification reaction may be effectively performed by using only a small amount of the surface modifier, a hydrophobic metal oxide-silica composite aerogel having a low degree of hydrophobicity and containing about 1 wt % to 2 wt % of carbon may be prepared.

Step 4 is a step of drying the hydrophobic metal oxide-silica composite wet gel for the preparation of a hydrophobic metal oxide-silica composite aerogel.

In this case, in the preparation method according to the embodiment of the present invention, a step of washing may be further performed before the drying, and the washing is to obtain a high purity hydrophobic metal oxide-silica composite aerogel by removing impurities (e.g., unreacted products, by-products, etc.) generated during the reaction, wherein the washing is not particularly limited and may be performed by a conventional method in the art.

For example, the washing may be performed by adding a non-polar organic solvent to the hydrophobic metal oxide-silica composite wet gel and stirring for 20 minutes to 1 hour. The non-polar organic solvent may be the same as described above.

The drying may be performed by atmospheric pressure drying at a temperature of 100° C. to 150° C. for 1 hour to 4 hours, after a water layer is separated and removed from the hydrophobic metal oxide-silica composite wet gel.

Also, the present invention provides a hydrophobic metal oxide-silica composite aerogel prepared by the above preparation method.

The aerogel according to an embodiment of the present invention may be one in which silica is doped with metal oxide, and the metal oxide may be a combination of magnesium oxide (MgO) and calcium oxide (CaO). That is, the aerogel may include magnesium oxide (MgO), calcium oxide (CaO), and silica ($SiO_2$).

Herein, the doping denotes that a limited amount of a foreign material is added to a pure material, and, for example, may denote that the metal oxide is bonded in a crystal lattice of the silica.

The aerogel according to the embodiment of the present invention may have a specific surface area of 350 $m^2/g$ to 550 $m^2/g$.

Furthermore, the hydrophobic metal oxide-silica composite aerogel may have a tap density of 0.08 g/ml to 0.132 g/ml and may have a carbon content of 1.02 wt % to 10.23 wt %.

Hereinafter, the present invention will be described in more detail, according to the following examples and experimental examples. However, the following examples and experimental examples are merely presented to exemplify the present invention, and the scope of the present invention is not limited thereto.

Example 1

A hydrophobic metal oxide-silica composite aerogel was prepared through steps illustrated in FIG. 2.

Specifically, a metal ion solution (metal ion concentration 0.33 M, $Mg^{2+}$:$Ca^{2+}$=2:1 molar ratio) was added to a water glass solution (water glass concentration 1.0 M) and mixed together to prepare a hydrophilic metal oxide-silica composite gel agglomerate. In this case, the metal ion solution was added in an amount such that an amount of metal ions in the metal ion solution was 0.33 moles with respect to water glass in the water glass solution. The prepared agglomerate was dried at 150° C. for 1 hour to prepare a powdery metal oxide-silica composite gel. Thereafter, after the metal oxide-silica composite gel was dispersed in 200 ml of hexane and hexamethyldisilazane was added in an amount of 0.33 moles with respect to the water glass in the water glass solution, a hydrophobic metal oxide-silica composite wet gel was prepared by performing a reaction for 1 hour while stirring at 150 rpm and 60° C. A hydrophobic metal oxide-silica composite aerogel was prepared by atmospheric pressure drying the prepared hydrophobic metal oxide-silica composite wet gel in an oven at 150° C. for 1 hour.

Example 2

A hydrophobic metal oxide-silica composite aerogel was prepared in the same manner as in Example 1 except that hexamethyldisilazane was used in an amount of 0.27 moles with respect to water glass.

Example 3

A hydrophobic metal oxide-silica composite aerogel was prepared in the same manner as in Example 1 except that hexamethyldisilazane was used in an amount of 0.20 moles with respect to water glass.

Example 4

A hydrophobic metal oxide-silica composite aerogel was prepared in the same manner as in Example 1 except that hexamethyldisilazane was used in an amount of 0.13 moles with respect to water glass.

Example 5

A hydrophobic metal oxide-silica composite aerogel was prepared in the same manner as in Example 1 except that hexamethyldisilazane was used in an amount of 0.07 moles with respect to water glass.

Example 6

A hydrophobic metal oxide-silica composite aerogel was prepared in the same manner as in Example 1 except that hexamethyldisilazane was used in an amount of 0.03 moles with respect to water glass.

Comparative Example 1

A metal ion solution (metal ion concentration 0.33 M, $Mg^{2-}$:$Ca^{2+}$=2:1 molar ratio) was added to a water glass solution (water glass concentration 1.0 M) and mixed together to prepare a hydrophilic metal oxide-silica composite gel. In this case, the metal ion solution was added in an amount such that an amount of metal ions in the metal ion solution was 0.33 moles with respect to water glass in the water glass solution. 200 ml of hexane was added to the prepared metal oxide-silica composite gel and primary solvent substitution was performed to prepare a primarily solvent-substituted wet gel. After hexamethyldisilazane was added to the primarily solvent-substituted wet gel in an amount of 1.5 moles with respect to the water glass in the water glass solution, a reaction was performed at 60° C. for 1 hour, 100 ml of hexane was then added thereto, and secondary solvent substitution was performed to prepare a hydrophobic metal oxide-silica composite wet gel. A hydrophobic metal oxide-silica composite aerogel was prepared by atmospheric pressure drying the prepared hydrophobic metal oxide-silica composite wet gel in an oven at 150° C. for 1 hour.

Comparative Example 2

A hydrophobic metal oxide-silica composite aerogel was prepared in the same manner as in Comparative Example 1 except that hexamethyldisilazane was used in an amount of 1.0 mole with respect to water glass.

Comparative Example 3

A hydrophobic metal oxide-silica composite aerogel was prepared in the same manner as in Comparative Example 1 except that hexamethyldisilazane was used in an amount of 0.8 moles with respect to water glass.

Comparative Example 4

A hydrophobic metal oxide-silica composite aerogel was prepared in the same manner as in Comparative Example 1 except that hexamethyldisilazane was used in an amount of 0.33 moles with respect to water glass.

Comparative Example 5

A metal ion solution (metal ion concentration 0.33 M, $Mg^{2-}$:$Ca^{2+}$=2:1 molar ratio) was added to a water glass solution (water glass concentration 1.0 M) and mixed together to prepare a hydrophilic metal oxide-silica composite gel agglomerate. In this case, the metal ion solution was added in an amount such that an amount of metal ions in the metal ion solution was 0.33 moles with respect to water glass in the water glass solution. Thereafter, after the metal oxide-silica composite gel agglomerate was dispersed in 200 ml of hexane and hexamethyldisilazane was added in an amount of 0.27 moles with respect to the water glass in the water glass solution, a reaction was performed for 1 hour while stirring at 150 rpm and 60° C. to prepare a hydrophobic metal oxide-silica composite wet gel. A hydrophobic metal oxide-silica composite aerogel was prepared by atmospheric pressure drying the prepared hydrophobic metal oxide-silica composite wet gel in an oven at 150° C. for 1 hour.

Experimental Example

Figure 3:
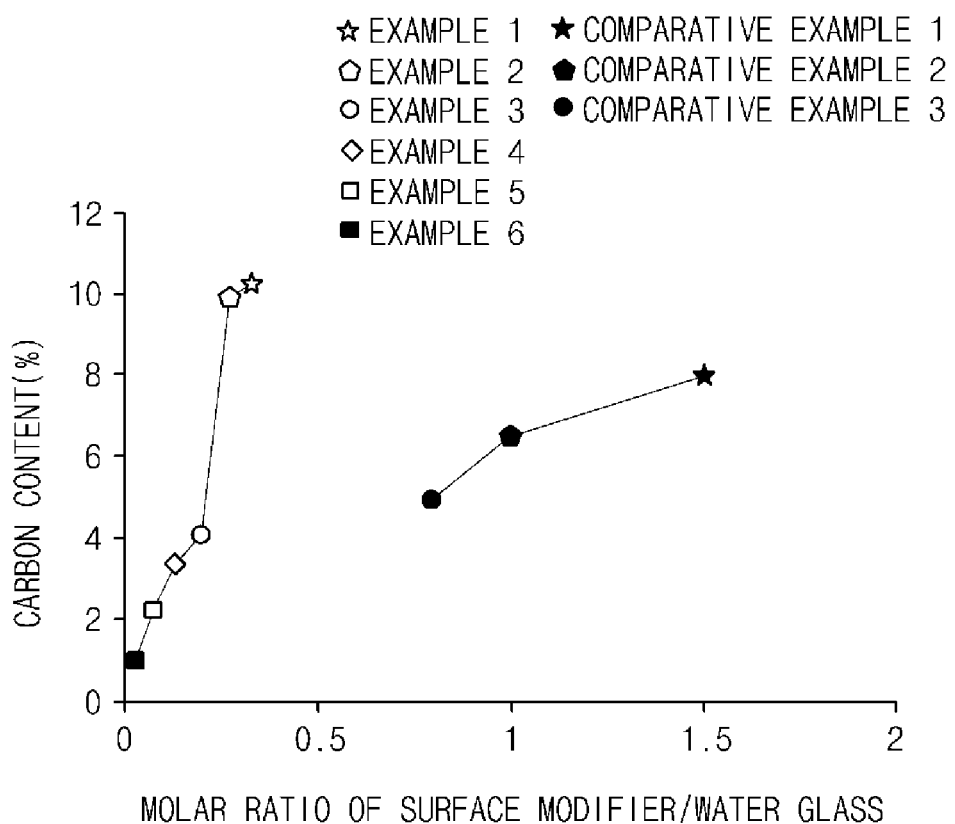
FIG. 3 is a graph in which carbon contents of hydrophobic metal oxide-silica composite aerogels of Examples 1 to 6 according to an embodiment of the present invention and hydrophobic metal oxide-silica composite aerogels of Comparative Examples 1 to 3 are comparatively analyzed.

In order to compare physical properties of the hydrophobic metal oxide-silica composite aerogels prepared in Examples 1 to 6 and Comparative Examples 1 to 5, tap density (g/ml), specific surface area (Brunauer-Emmett-Teller (BET), $m^2/g$), and carbon content (wt %) of each aerogel were measured. The results thereof are presented in Table 1 and FIG. 3 below.

(1) Tap Density (g/Ml)

Tap density was measured using a tap density tester (TAP-2S, Logan Instruments, Co.).

Specifically, after a weight of each aerogel was measured by putting the each aerogel into a standardized cylinder (10 ml), the cylinder was then fixed to the tap density tester, a noise damping hood was closed, and 2,000 tappings were set. After tapping measurement was completed, a volume of each aerogel in the cylinder was measured, and density was measured by calculating a ratio of the weight previously measured to the volume.

(2) Specific Surface Area (BET, $m^2/g$)

Specific surface areas were analyzed from amounts of nitrogen adsorbed and desorbed according to partial pressure ($0.11 < p/p_o < 1$) using an ASAP 2010 analyzer (Micromeritics).

Specifically, 100 mg of each aerogel was put in a cylinder and was subjected to a pretreatment at 180° C. for 8 hours, and the specific surface area was then measured using the specific surface area analyzer.

(3) Carbon Content (wt %)

Carbon contents were measured using a carbon analyzer (Carbon-Sulfur Analyzer CS-2000, Eltra GmbH).

TABLE 1

| Category | Molar ratio of surface modifier/water glass | Tap density (g/ml) | Carbon content (wt %) | Specific surface area (m$^2$/g) |
|---|---|---|---|---|
| Example 1 | 0.33 | 0.132 | 10.23 | 550 |
| Example 2 | 0.27 | 0.130 | 9.83 | 480 |
| Example 3 | 0.20 | 0.125 | 4.11 | 460 |
| Example 4 | 0.13 | 0.105 | 3.37 | 400 |
| Example 5 | 0.07 | 0.101 | 2.21 | 380 |
| Example 6 | 0.03 | 0.080 | 1.02 | 350 |
| Comparative Example 1 | 1.5 | 0.088 | 7.98 | 520 |
| Comparative Example 2 | 1.0 | 0.098 | 6.51 | 480 |
| Comparative Example 3 | 0.8 | 0.101 | 5.01 | 450 |
| Comparative Example 4 | 0.33 | 0.135 | 3.77 | 370 |
| Comparative Example 5 | 0.27 | 0.141 | 3.12 | 310 |

As illustrated in Table 1, it was confirmed that the hydrophobic metal oxide-silica composite aerogels of Examples 1 to 6 prepared by the preparation method according to the embodiment of the present invention generally had excellent specific surface area characteristics and low tap densities in comparison to the hydrophobic metal oxide-silica composite aerogels of Comparative Examples 1 to 5 and had better degrees of hydrophobicity despite of using a smaller amount of the surface modifier.

Specifically, as a result of comparing the hydrophobic metal oxide-silica composite aerogel of Example 1 prepared by the preparation method according to the embodiment of the present invention and the hydrophobic metal oxide-silica composite aerogels of Comparative Examples 1 to 3, the hydrophobic metal oxide-silica composite aerogels of Comparative Examples 1 to 3, which were prepared by respectively using about 4.5 times, about 3 times, and about 2.4 times the amount of the surface modifier, had carbon contents, which were respectively reduced to levels of about 78%, about 65%, and about 49%, and specific surface areas, which were respectively reduced to levels of about 94%, about 87%, and about 82%, in comparison to the hydrophobic metal oxide-silica composite aerogel of Example 1.

Also, with respect to the hydrophobic metal oxide-silica composite aerogel of Comparative Example 4 which was prepared by a conventional and general preparation method although the same amount of the surface modifier as Example 1 prepared according to the embodiment of the present invention, the tap density was similar to that of the hydrophobic metal oxide-silica composite aerogel of Example 1, but the specific surface was reduced to a level of about 67% and the carbon content was significantly reduced to a level of about 37% in comparison to the hydrophobic metal oxide-silica composite aerogel of Example 1.

In addition, with respect to the hydrophobic metal oxide-silica composite aerogel of Comparative Example 5 which was prepared in the same manner as in Example 2 except that the primary drying step was not performed, the tap density was increased, the specific surface area was reduced to a level of about 64%, and the carbon content was significantly reduced to a level of about 32% in comparison to the hydrophobic metal oxide-silica composite aerogel of Example 2.

The hydrophobic metal oxide-silica composite aerogels of Examples 3 and 6 prepared by the preparation method according to the embodiment of the present invention had high specific surface area characteristics and carbon contents despite the fact that the hydrophobic metal oxide-silica composite aerogels of Examples 3 and 6 were prepared by using a smaller amount of the surface modifier than Comparative Examples 1 to 5. Particularly, with respect to the hydrophobic metal oxide-silica composite aerogels of Examples 5 and 6 prepared by using a very small amount of the surface modifier, the surface modification reaction was relatively easily performed and the tap density and specific surface area characteristics were excellent in comparison to the hydrophobic metal oxide-silica composite aerogels of Comparative Examples 1 to 5 prepared by using a larger amount of the surface modifier, despite the fact that the hydrophobic metal oxide-silica composite aerogels of Examples 5 and 6 were prepared by using a very small amount of the surface modifier.

As shown in the above results, since the surface modification reaction may be performed even if a very small amount of the surface modifier was used in the preparation method according to the embodiment of the present invention, a hydrophobic metal oxide-silica composite aerogel having a low degree of hydrophobicity and containing an extremely low amount of carbon may not only be prepared, but a hydrophobic metal oxide-silica composite aerogel having a high degree of hydrophobicity and containing a large amount of carbon may also be prepared by adjusting the amount of the surface modifier used, if necessary.

The invention claimed is:

1. A method of preparing a hydrophobic metal oxide-silica composite aerogel, the method comprising steps of:
   (1) adding a metal ion solution to a water glass solution and mixing together to prepare a metal oxide-silica composite gel agglomerate, wherein the metal ion solution is a binary metal ion solution including calcium ions ($Ca^{2+}$) and magnesium ions ($Mg^{2+}$);
   (2) primarily drying the metal oxide-silica composite gel agglomerate so that moisture in the agglomerate is completely removed to prepare a powdery metal oxide-silica composite gel;
   (3) surface-modifying the powdery metal oxide-silica composite gel by adding and dispersing the powdery metal oxide-silica composite gel into a non-polar solvent, adding a surface modifier, and performing a reaction to prepare a hydrophobic metal oxide-silica composite wet gel; and
   (4) secondarily drying the hydrophobic metal oxide-silica composite wet gel to yield the hydrophobic metal oxide-silica composite aerogel.

2. The method of claim 1, wherein a concentration of water glass in the water glass solution is in a range of 0.1 to 2.0 M.

3. The method of claim 1, wherein a concentration of metal ions in the metal ion solution is in a range of 0.05 M to 2.0 M.

4. The method of claim 1, wherein a molar ratio of the calcium ion ($Ca^{2+}$) to the magnesium ion ($Mg^{2+}$) in the metal ion solution is in a range of 1:0.3 to 1:3.

5. The method of claim 1, wherein the metal ion solution is added in an amount such that a molar ratio of metal ions to water glass is in a range of 0.1 to 1.

6. The method of claim 1, wherein, in step 1, an acid catalyst is further added and mixed together.

7. The method of claim 1, wherein the primary drying of step 2 is performed by atmospheric pressure drying at a temperature of 100° C. to 150° C. for 1 hour to 2 hours.

8. The method of claim 1, further comprising washing the agglomerate with distilled water, alcohol, or a mixture thereof before the primary drying of step 2.

9. The method of claim 1, wherein the surface modifier comprises at least one selected from the group consisting of trimethylchlorosilane (TMCS), hexamethyldisilazane (HMDS), methyltrimethoxysilane, and trimethylethoxysilane.

10. The method of claim 1, wherein the surface modifier is added in a molar ratio of 0.01 to 0.5 with respect to water glass.

11. The method of claim 1, wherein the surface modification is performed at a temperature of 55° C. to 65° C.

12. The method of claim 1, wherein the secondary drying of step (4) is performed by atmospheric pressure drying at a temperature of 100° C. to 150° C. for 1 hour to 4 hours.

\* \* \* \* \*